United States Patent [19]

Furushima et al.

[11] Patent Number: 5,644,373
[45] Date of Patent: Jul. 1, 1997

[54] LIQUID CRYSTAL DEVICE WITH SUBSTRATES OF DIFFERENT MATERIALS AND SIMILAR THERMAL EXPANSION COEFFICIENTS

[75] Inventors: Teruhiko Furushima; Shigetoshi Sugawa, both of Atsugi; Moriyuki Okamura, Sagamihara; Masaru Kamio, Kawasaki; Mamoru Miyawaki, Isehara, all of Japan

[73] Assignee: Canon Kabushiki Kaisha, Tokyo, Japan

[21] Appl. No.: 312,172

[22] Filed: Sep. 26, 1994

Related U.S. Application Data

[63] Continuation of Ser. No. 10,295, Jan. 28, 1993, abandoned.

[30] Foreign Application Priority Data

Jan. 31, 1992 [JP] Japan .................. 4-040493
Dec. 28, 1992 [JP] Japan .................. 4-358844

[51] Int. Cl.$^6$ .................. G02F 1/1333; G02F 1/13
[52] U.S. Cl. .................. 349/158; 349/187
[58] Field of Search .................. 359/82; 349/158, 349/187

[56] References Cited

U.S. PATENT DOCUMENTS

| | | | |
|---|---|---|---|
| 4,130,408 | 12/1978 | Crossland et al. | 359/82 |
| 4,256,382 | 3/1981 | Piliavin et al. | 359/82 |
| 4,394,067 | 7/1983 | Spruijt et al. | 359/80 |
| 4,744,639 | 5/1988 | Sekimura et al. | 359/54 |
| 4,810,062 | 3/1989 | Aoki et al. | 359/85 |
| 4,917,471 | 4/1990 | Takao et al. | 359/68 |
| 5,148,301 | 9/1992 | Sawatsubashi et al. | 359/80 |
| 5,155,612 | 10/1992 | Adachi et al. | 359/83 |
| 5,200,847 | 4/1993 | Mawatari et al. | 359/59 |
| 5,319,479 | 6/1994 | Yamada et al. | 359/82 |

FOREIGN PATENT DOCUMENTS

| | | | |
|---|---|---|---|
| 55-28024 | 2/1980 | Japan | 359/82 |
| 58-143374 | 8/1983 | Japan . | |
| 60-198581 | 10/1985 | Japan . | |
| 2204980 | 11/1988 | United Kingdom . | |

*Primary Examiner*—William L. Sikes
*Assistant Examiner*—Charles Miller
*Attorney, Agent, or Firm*—Fitzpatrick, Cella, Harper & Scinto

[57] ABSTRACT

A liquid crystal device having a pair of substrates opposed to each other at a predetermined distance from each other, and a liquid crystal enclosed between the pair of substrates. The pair of substrates are formed of different materials, and the difference between the thermal expansion coefficients of the substrates is set within the range of ±50% of the thermal expansion coefficient of one of the two substrates. Misalignment between the substrates is thereby prevented.

11 Claims, 7 Drawing Sheets

LIQUID CRYSTAL DEVICE WITH SUBSTRATES OF DIFFERENT MATERIALS AND SIMILAR THERMAL EXPANSION COEFFICIENTS

This application is a continuation of application Ser. No. 08/010,295 filed Jan. 28, 1993, now abandoned.

BACKGROUND OF THE INVENTION

1. Field of the Invention

This invention relates to a liquid crystal device constituting a liquid crystal display (LCD), a liquid crystal light valve (LCLV) for use in a liquid crystal printer, or other kinds of apparatuses.

2. Description of the Related Art

An ordinary liquid crystal device has a structure in which a liquid crystal material is interposed between two substrates and peripheral portions of the substrates are sealed with a sealing material.

Conventionally, the same types of material are used as such two substrates. But, if a silicon wafer is used as a TFT substrate as in the case of an active matrix LCD, the same Si wafer cannot be used as the other of the two substrates. In this case, a transparent substrate is used instead of the Si wafer substrate, because the Si wafer is not light-transmissive. Also, if a quartz glass member is used as a TFT substrate instead of Si wafer, a low-priced transparent substrate is used as the other of the two substrates by considering the production cost.

However, a problem arises since glass #7059, a product from Corning Inc., generally used as low-alkali glass, has a thermal expansion coefficient greatly different from that of the Si wafer. If two substrates formed of such glass and a silicon wafer are bonded to each other and set by heat, a thermal strain remains and a problem of a warp of cells arises. In such a case, it is difficult to manufacture a desired liquid crystal device. This has been one of the causes of difficulty in improving the yield.

On the other hand, to optimize the desired high-performance of a liquid crystal device, it is necessary to selectively use substrates formed of different materials including those differing in composition and crystalline structure, according to one's need.

SUMMARY OF THE INVENTION

In view of the above-described problems, an object of the present invention is to provide a liquid crystal device which is not easily influenced by a heat strain of two substrates.

Another object of the present invention is to provide, at a low manufacturing cost, a high-performance liquid crystal device using two substrates formed of different materials by improving the manufacturing yield.

Still another object of the present invention is to provide a liquid crystal device comprising a pair of substrates opposed at a predetermined distance from each other, and a liquid crystal enclosed between the pair of substrates, wherein the pair of substrates are formed of different materials, and wherein the difference between the thermal expansion coefficients of the substrates is within the range of ±50% of the thermal expansion coefficient of one of the two substrates.

According to the present invention, misalignment between the substrates or liquid crystal cells is not easily caused in any operating environment. Thus, the reduction in yield due to the occurrence of such misalignment during the manufacturing process can be reduced.

BRIEF DESCRIPTION OF THE DRAWINGS

FIG. 3a–d is a schematic diagram of a process of manufacturing a liquid crystal device in accordance with Embodiment 1 of the present invention;

FIG. 5a–d is a schematic diagram of a process of manufacturing substrates in accordance with the present invention;

FIG. 6a–e is a schematic diagram of a process of manufacturing a liquid crystal device in accordance with Embodiment 5 of the present invention;

DESCRIPTION OF THE PREFERRED EMBODIMENTS

A combination of two substrates used in accordance with the present invention is selected so that the difference between the thermal expansion coefficients of the substrates is ±50% or less, more preferably, ±10% or less, most preferably, ±5% or less.

More specifically, in a case where a silicon wafer (having a thermal expansion coefficient of $36.1 \times 10^{-7}/°C$. at 227° C.) is used as one of two substrates, glass selected from products from Corning Inc., #1733 ($36.5 \times 10^{-7}/°C$.) and #1727 ($44 \times 10^{-7}/°C$.), a product from Asahi Glass Co., Ltd., AL ($37 \times 10^{-7}/°C$.), and a product from NH Techno Glass, NA-35 ($37 \times 10^{-7}/°C$.) may be used as the other substrate.

In accordance with the present invention, the thermal expansion coefficient of a specimen may be measured with a differential dilatometer for measuring the difference between the expansions of the specimen and a standard member formed of quartz glass with respect to temperatures.

As a method for measuring a displacement caused by a thermal expansion, a method using a dial gauge or a method using a differential transformer is ordinarily used.

For example, in a case where a 6 inch Si wafer is used and the cell formation processing temperature is increased from 25° to 200° C., the elongation of the Si wafer is 94.9 μm and the elongation of AL is 97.1 μm. It is understood that the difference from the Si wafer is very small, 2.3 μm, and that pixel misalignment can be limited. On the other hand, the elongation of #7059 ordinarily used is 123.4 μm and the difference from the Si wafer is very large, 29 μm.

If the above-described substrates is used to form a light-transmissive type liquid crystal device, it is desirable to use transparent quartz glass as one of the two substrates. Conversely, if an active matrix type liquid crystal device having a high-performance active component is formed, quartz glass may be used but it is more desirable to use a non-transparent semiconductor substrate such as a silicon wafer as one of two substrates. Further, if a liquid crystal device of an active matrix type and of a light-transmissive type having a high-performance active component is formed, it is desirable to use a partial transmission type semiconductor substrate which is prepared by forming a light-transmissive insulating film on a semiconductor substrate and removing portions of the substrate under the insulating film.

Such a partial transmission type substrate will be described below.

Figure 1:
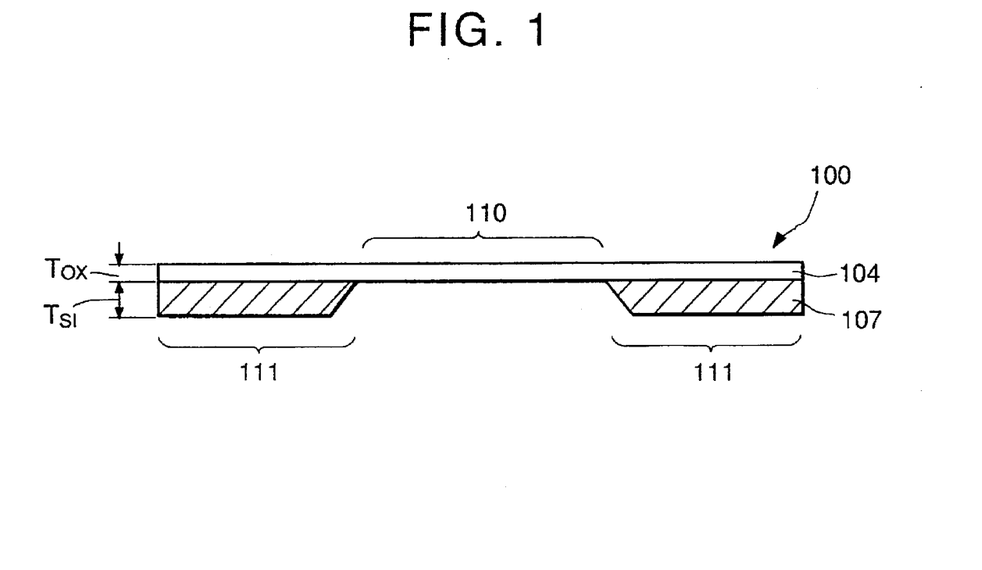
FIG. 1 is a schematic cross-sectional view of one of a pair of substrates used in accordance with the present invention.

FIG. 1 is a schematic cross-sectional view of a partial-transmission type substrate 100 having a light-transmissive portion 110 and a non-light-transmissive portion 111. The substrate 100 includes a light-transmissive layer 104 forming the light-transmissive portion 110 and a non-light-transmissive layer 107. The thicknesses $T_{SI}$, $T_{OX}$ of these layers have a relationship: $T_{SI} > T_{OX}$. As light-transmissive layer 104, an insulating layer formed of a silicon oxide film, silicon nitride film or a lamination of these films is preferably used. As non-light-transmissive layer 107, a layer of a semiconductor such as silicon is preferably used. Elements for forming a liquid crystal device, i.e., electrodes, a wiring, an oriented film, active components, selected as desired, are provided on the light-transmissive layer 104.

Figure 2:
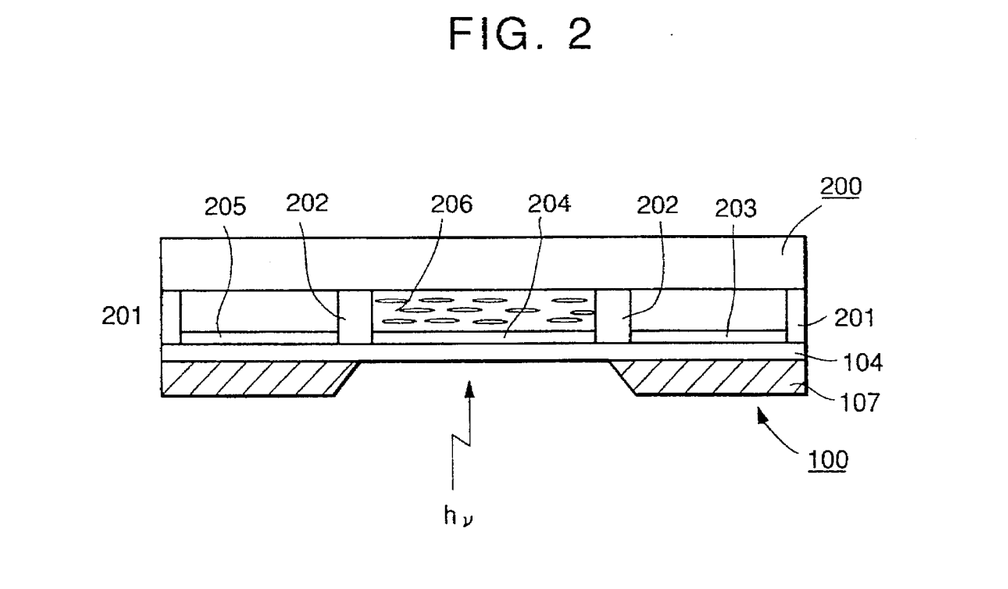
FIG. 2 is a schematic cross-sectional view of an example of a liquid crystal device in accordance with the present invention.

FIG. 2 is a schematic cross-sectional view of a liquid crystal device in which another substrate 200 is provided on the substrate 100 illustrated in FIG. 1 with a liquid crystal material 206 interposed therebetween.

The difference between the thermal expansion coefficients of the substrate 200 and the non-light-transmissive layer 107 which is a main supporting portion of the substrate 100 is set to 50% or less, more preferably 10or less, most preferably, 5% or less of the thermal expansion coefficient of the substrate 100.

To form the liquid crystal device, an active matrix 204 including thin film transistors provided as active components, a scanning electrode wiring and a signal electrode wiring, a peripheral circuit 203 for driving this matrix, and other components, selected as desired, are provided on the substrate 100. Members 201 and 202 are sealing members. The sealing members 202 serve to enclose the liquid crystal 206, and the sealing members 201 serve to enclose the peripheral circuit 203. Each of the sealing members 201 and 202 is located on the non-light-transmissive layer 107.

In the liquid crystal device constructed in accordance with one embodiment of the present invention as shown in FIG. 2, the peripheral circuit 203 is interposed between the two substrates 100 and 200 along with the active matrix 204. Therefore, the two substrates serve as members for protecting the peripheral circuit.

Embodiments of the present invention will be described below. The present invention, which is not limited to the embodiments described below, includes similar arrangements in which the component design is changed or the members are changed within ranges such as to ensure the achievement of the object of the invention.

Embodiment 1

FIGS. 3(a) to 3(d) show a method of manufacturing a liquid crystal device in accordance with Embodiment 1 of the present invention. A silicon wafer with TFTs is used as one substrate, and an opposing substrate formed of glass (AL, a product from Asahi Glass Co., Ltd.) having a thermal expansion coefficient with a difference of 5% or less from that of the Si wafer is used.

In this embodiment, as described below in detail, an ultraviolet (UV) setting resin is temporarily placed on a substrate, and a sealing material formed of a thermosetting resin is completely set by thermosetting while two substrates are correctly positioned. Occurrence of an error in positioning (misalignment) can be prevented by definitely setting the difference between the thermal expansion coefficients of the two substrates within the range of ±50% and by the effect of the temporary placement of the UV setting resin.

Figure 3A:
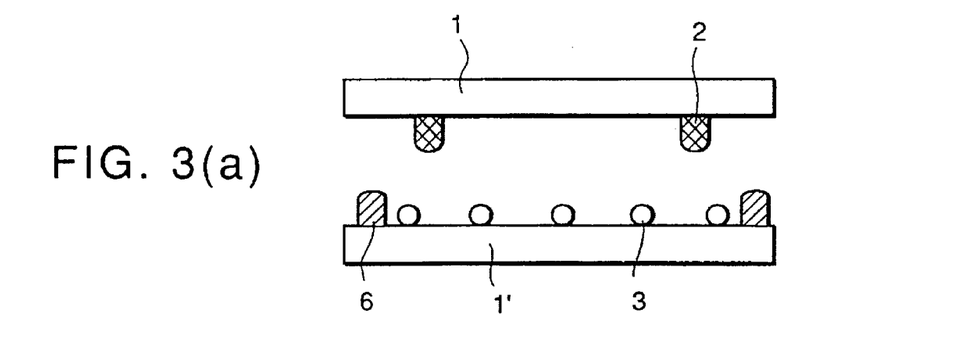
Figure 3B:
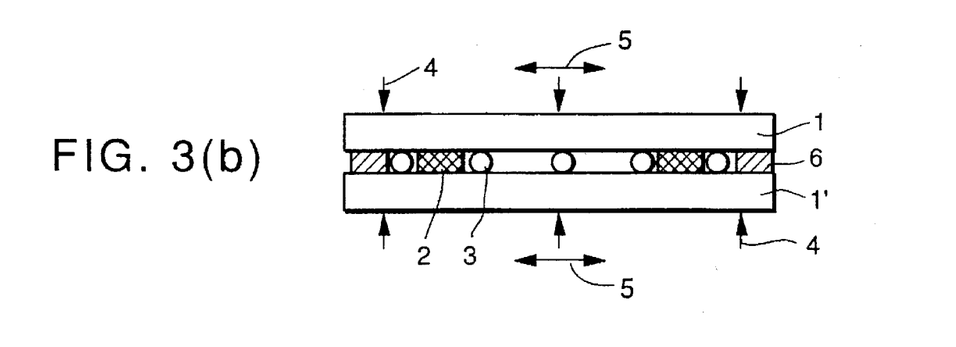
Figure 3C:
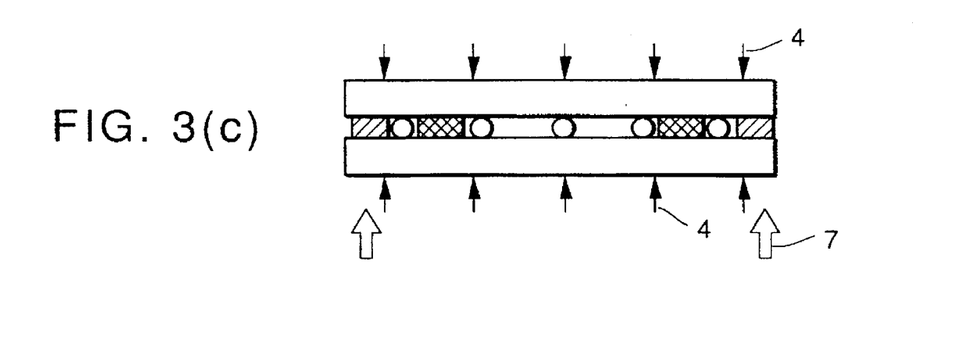
Figure 3D:
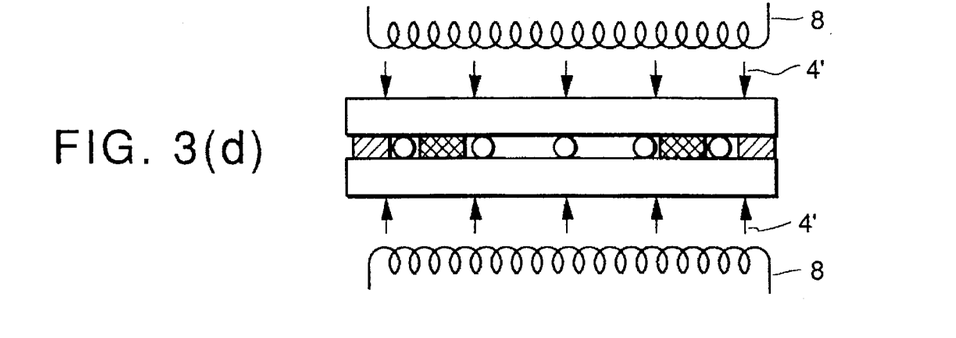

First, spacers (not shown) having a diameter of 6 μm are placed at predetermined positions on a substrate 1' shown in FIG. 3(a) to maintain a predetermined thickness at the time of sealing. A thermosetting adhesive (sealing material) 2 is formed on substrate 1 by screen printing. Spherical resin balls (spacing members) 3 having a diameter of 7 μm and used to maintain a predetermined distance between the substrates are placed dispersively on the substrate 1'. Thereafter, about 0.5 mm² of an ultraviolet setting adhesive 6 is applied, by a precision ejector, to the substrate 1' at predetermined positions beyond the regions finally used as the display area of the liquid crystal display. Then, the two substrates are superposed on each other at a predetermined position by using a superposing apparatus and by confirming, through a microscope, superposition marks (not shown) formed on the two substrates at the time of the formation of electrodes, as shown in FIG. 3(b). After the completion of this positioning, the substrates are pressed in the direction of arrow 4 at a pressure of about 0.5 kgf/cm² uniformly through the entire area thereof, as shown in FIG. 3(c). When the thickness of the sealing material is thereby reduced to a predetermined value, the applied ultraviolet setting adhesive 6 is irradiated with ultraviolet rays 7 through ultraviolet irradiation gaps in the pressing apparatus by using a spot exposure apparatus having an irradiation area diameter of about 10 mm, while the superposition marks are confirmed again, thereby setting the adhesive 6. The above described steps of superposition→positioning→pressing→ultraviolet irradiation are performed in one processing unit.

Embodiment 2

Figure 4:
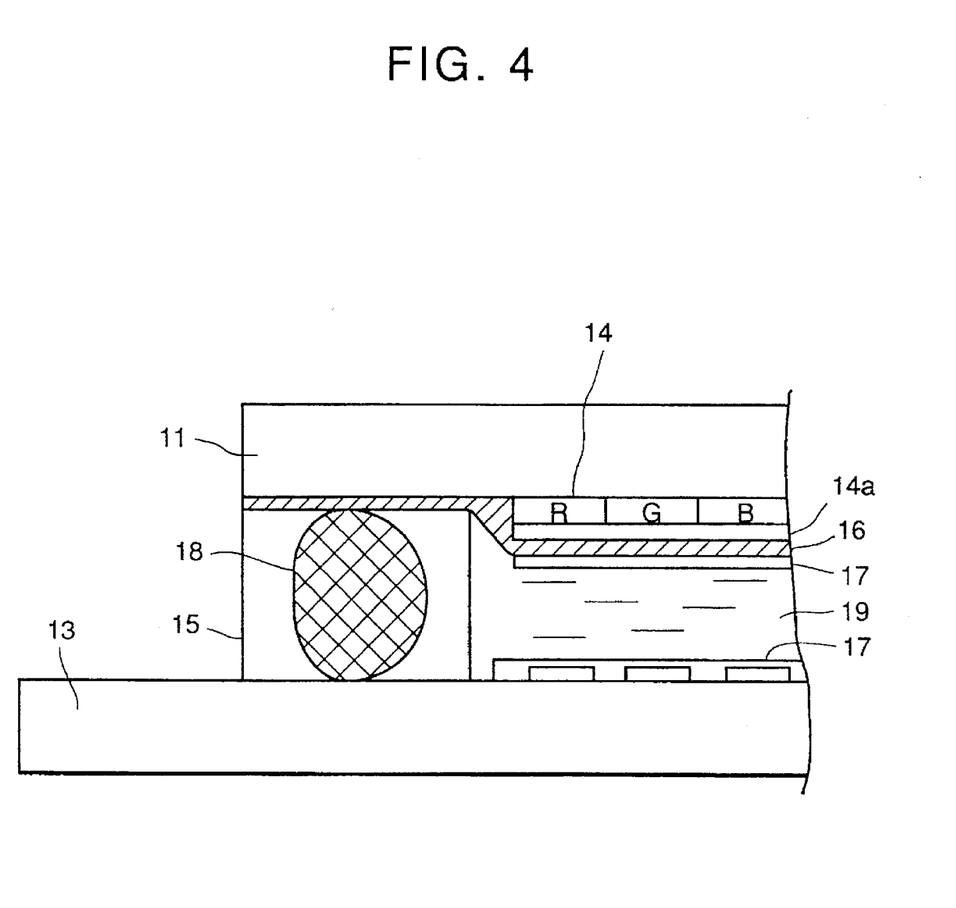
FIG. 4 is a schematic diagram of a portion of a liquid crystal device in accordance with Embodiment 2 of the present invention.

FIG. 4 is a cross-sectional view of a portion of a liquid crystal device in accordance with Embodiment 2 of the present invention. Embodiment 2 relates to an application of the present invention to a color liquid crystal display. A silicon wafer is used as a substrate 13 with TFTs, and an opposing substrate 11 formed of glass (NA-35, a product from NH Techno Glass) having a thermal expansion coefficient with a difference of ±5% or less from that of the Si wafer is used. In Embodiment 2, a color filter layer 14 is formed on the opposing substrate 11 so as to have red, green and blue portions by repeating the following steps a to d five times.

Step a: a dyeing base is formed over the entire surface by spin coating so as to form a predetermined pattern.

Step b: Dyeing is performed with a dyestuff having predetermined spectroscopic characteristics.

Step c: a protective film is formed over the entire surface of the substrate by spin coating.

Step d: Portions of the protective film in peripheral areas where the substrate contacts a sealing material 15 (hereinafter referred to as sealing areas) are removed by patterning the protective film 14a.

Next, ITO is formed on the color filter 14 and on the protective film 14a by sputtering to form a common electrode 16.

The method of forming the protective film is not limited to patterning, and any method may be used so long as the protective film is not formed in the sealing areas. For example, roll coating, screen printing, mask deposition or mask sputtering may be used.

Then, pixel electrodes 12 connected to TFTs are formed on the substrate 13.

An oriented film 17 is formed on each of the pair of substrates by roll coating or any other kind of printing method, followed by rubbing.

An ultraviolet setting resin in which spacers 18 are mixed is formed as sealing material 15 by screen printing. Next, the pair of substrates are attached and pressed against each other. Thereafter, the sealing material is set by irradiation with ultraviolet rays to form liquid crystal cells with a liquid crystal 19 enclosed therein, thus obtaining a liquid crystal panel.

In the above-described Embodiment 2, misalignment of the substrates and pixels can be prevented by the selection of the substrates, and penetration of the spacers into the color filter can also be prevented by forming the color filter layer at positions out of the area of contact with the sealing material and by directly connecting the sealing material to the common electrode, thereby facilitating the control of liquid crystal cell gaps. Moreover, absorption of ultraviolet rays by the color filter layer is prevented, so that the ultraviolet setting sealing material can be set in a short time. It is thereby possible to prevent incomplete setting of the sealing material. Further, the adhesion performance of the sealing agent is improved, so that the sealing reliability can be be remarkably improved.

Embodiment 3

Embodiment 3 is an example of a modification of Embodiment 1.

In Embodiment 3, cells are formed in the same manner as Embodiment 1 except that a silicon wafer is used as a TFT substrate 1'; an opposing substrate 1 formed of glass (#1733, a product from Corning Inc.) having a thermal expansion coefficient with a difference of ±5% or less from that of the Si wafer is used; a UV setting resin is used as a sealing material; spacers are mixed only in sealing portions (no spacing material 3 dispersively placed at pixel portions). According to this embodiment, misalignment can be prevented by the selection of the substrates and heating conditions at the time of cell formation can be relaxed by using only a UV setting resin as a sealing material. Also, display qualities can be improved because the spacers are mixed only in the sealing material and are not dispersively placed in the display area.

Embodiment 4

In Embodiment 4, electrodes are formed at predetermined positions on one surface of an opposing substrate member having a thickness of 0.5 μm and formed of Corning #1727 (having a thermal expansion coefficient of $44 \times 10^{-7}/°C$.). Another opposing substrate member having a thickness of 0.5 μm and formed of Corning #1733 (having a thermal expansion coefficient of $36.5 \times 10^{-7}/°C$.) is thereafter bonded by an epoxy resin to the other surface where no electrodes are formed. The #1727 side of the opposing substrate faces the TFT substrate. Cells are formed between these substrates. According to this embodiment, a stress caused in the Si wafer after the cell formation can be created as a tensile stress by bonding glass members having different thermal expansion coefficients to form the opposing substrate, i.e., a glass substrate having a plus thermal expansion coefficient relative to that of the Si wafer.

Figure 5A:
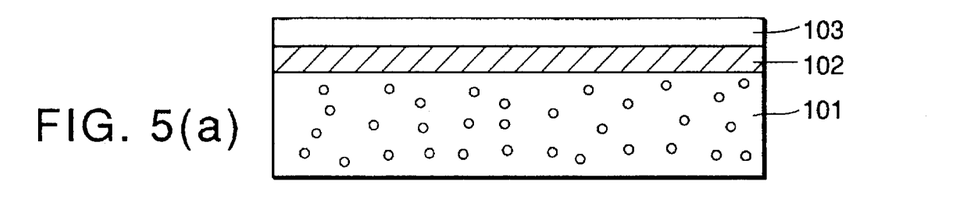
Figure 5B:
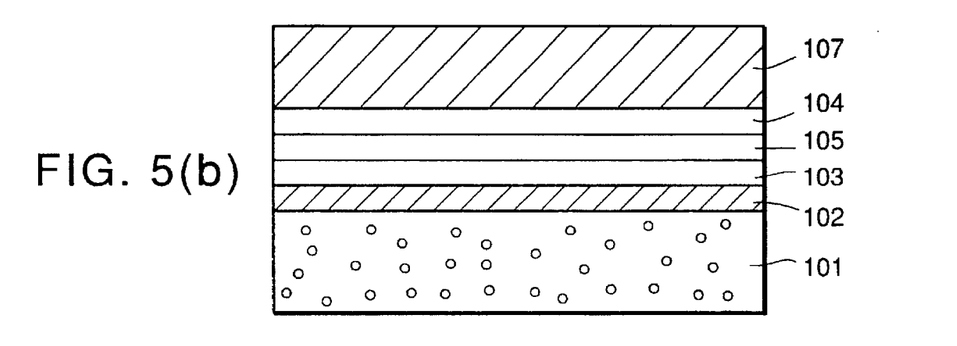
Figure 5C:
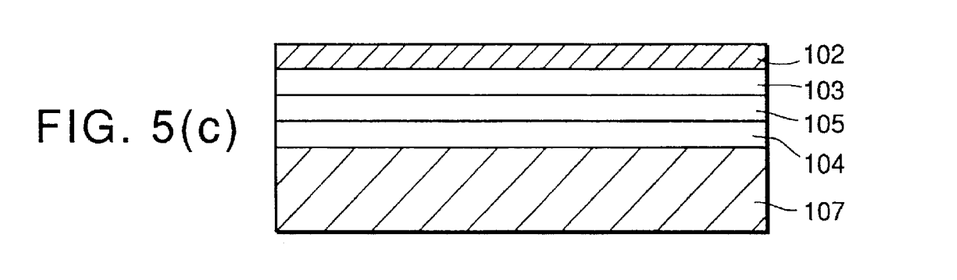

In each of the above-described embodiments, a quartz glass substrate can be used as a substrate with TFTs. However, a silicon substrate manufactured by a method shown in FIG. 5 is most preferred. This Si substrate is a silicon monocrystal substrate which is economical and uniformly flat over a large area and which has excellent crystalline properties. Semiconductor active devices are formed on a very smooth $i monocrystal layer of this substrate. Therefore, the semiconductor devices have a reduced floating capacitance and it is possible to provide a high-performance liquid crystal display in which semiconductor devices and circuits capable of high-speed operation, free from a latch-up phenomenon or the like and having improved radiation resistance characteristics are integrally formed on the same substrate.

An example of a method of manufacturing such a silicon substrate will be described below with reference to FIG. 5.

A P-type monocrystal Si substrate having a thickness of 300 μm is anodized in an HF solution to form a porous Si substrate.

This anodization is performed under conditions shown below.

| | |
|---|---|
| Applied voltage: | 2.6 V |
| Current density: | 30 (mA · cm$^{-2}$) |
| Anodization solution HF:H$_2$O:C$_2$H$_5$OH = 1:1:1 | |
| Time: | 2.4 (hours) |
| Thickness of porous Si: | 300 (μm) |
| Porosity: | 56% |

A silicon epitaxial layer 102 is grown on a P-type (100) porous Si substrate 101 obtained in this manner by a low pressure CVD method until it has a thickness of 1.0 μm. The following are the conditions of this deposition.

| | |
|---|---|
| Source gas: | SiH$_4$ |
| Carrier gas: | H$_2$ |
| Temperature: | 850° C. |
| Pressure: | $1 \times 10^{-2}$ Torr |
| Growing speed: | 3.3 nm/sec |

Next, an oxide layer 103 having a thickness of 1,000Å is formed on a surface of this epitaxial layer 102, and another Si substrate 107 having a surface on which an oxide layer 104 of 5,000Å and a nitride layer 105 of 1,000Å are formed is superposed on the oxide layer 103. These substrates are heated in a nitrogen atmosphere at 800° C. for 0.5 hour to be firmly bonded together.

Thereafter, the bonded substrates are processed by selective etching in a solution of a mixture of 49% hydrofluoric acid, alcohol and a 30% hydrogen peroxide solution (10:6:50) without agitating the solution. After 65 minutes, only the non-porous Si layer remains without being etched, and the porous Si substrate 101 is selectively etched and completely removed with monocrystal Si serving as an etching stop material. The etching speed of the non-porous Si monocrystal layer with respect to this etching solution is very low and the thickness of the etched portion is 50Å or less even after 65 minutes. The selection ratio of this etching speed and the etching speed of the porous layer is $10^{-5}$ or less at the minimum. The extent of etching of the non-porous layer (several angstroms) is practically negligible. Consequently, the Si substrate 101 made porous and having a thickness of 200 μm is removed, while the monocrystal Si layer 102 having a thickness of 1.0 μm is formed on the SiO$_2$ layer 103. If SiH$_2$Cl is used as a source gas, it is necessary to increase the growing temperature by several ten degrees. However, the speed-increased etching characteristic peculiar to the porous substrate can be maintained.

Thin film transistors are formed on the monocrystal silicon thin film 102. Thereafter, portions of the surface of the silicon substrate other than the portions located immediately below liquid crystal pixel portions are covered with a rubber resistant to hydrofluoric acid, and the corresponding potions of the silicon substrate between the surface and the insulating layer are removed by using a solution of a mixture of hydrofluoric acid, acetic acid, and nitric acid, thereby forming light-transmissive portions 110.

Figure 5D:
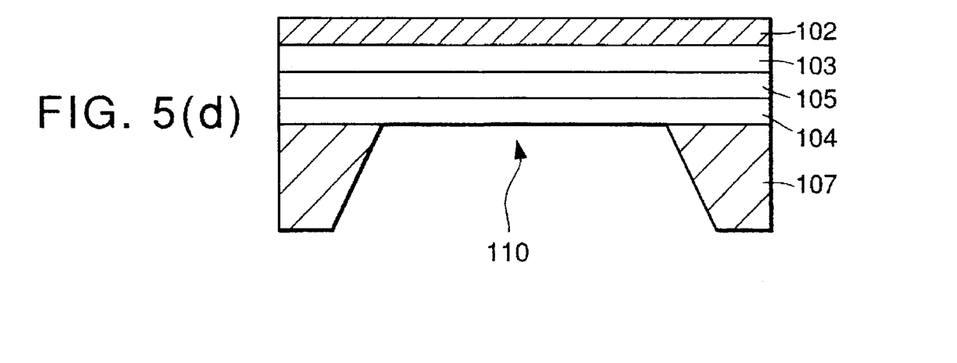

In this manner, a substrate with TFTs, such as that shown in FIG. 5(d) is manufactured.

Embodiment 5

Figure 6:
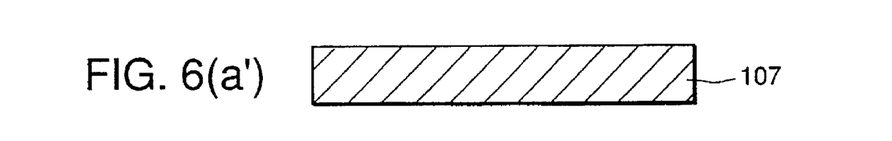

FIG. 6 is a schematic diagram of a method of manufacturing a liquid crystal device in accordance with Embodiment 5 of the present invention.

In accordance with the present invention, a light transmissive substrate formed of quartz glass or the like or a non-light-transmissive substrate such as a silicon wafer is used as one substrate, and another light-transmissive substrate having a thermal expansion coefficient with a difference of ±5% from that of the quartz glass or the Si wafer is used as an opposing substrate. Also, a plurality of land-like semiconductor regions are formed on the first substrate, and active devices such as TFTs are formed on the land-like regions.

Figure 6A:
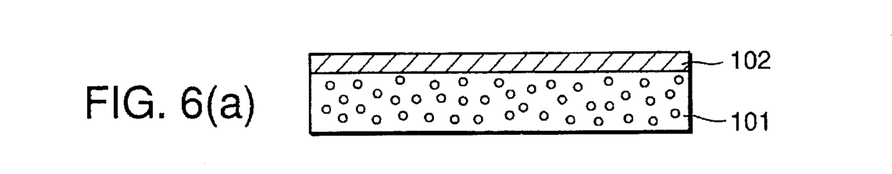

In the step shown in FIG. 6(a), a substrate having a porous layer 101 on which a semiconductor layer is formed is prepared by one of a method of making portions of a monocrystal substrate porous or a method of growing a semiconductor layer on a porous semiconductor substrate.

On the other hand, in the step shown in FIG. 6(a'), a substrate formed of quartz glass or a substrate having an insulating film on a silicon wafer is prepared.

Figure 6B:
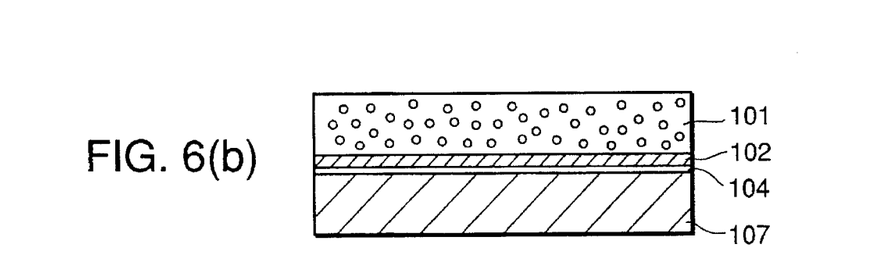

In the step shown in FIG. 6(b), the two substrates prepared are bonded to each other. A layer 104 is an insulating layer which corresponds to a part of a substrate 107 in the case of a quartz glass substrate, or a silicon oxide film formed on the surface in the case of a silicon wafer.

Figure 6C:
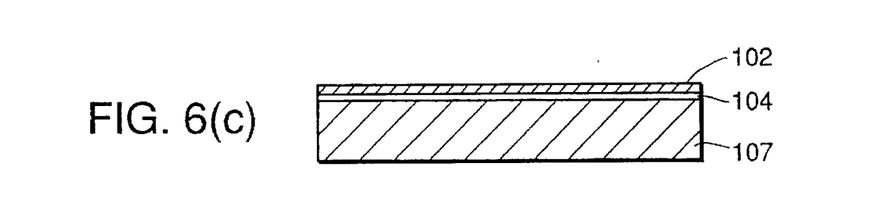

Next, in the step shown in FIG. 6(c), the porous layer 101 is removed by etching. A solution of a mixture of hydrofluoric acid, alcohol and a hydrogen peroxide solution, provided as an etchant, ensures a large selection ratio of the porous layer 101 and the semiconductor layer non-porous) 102 and, hence, the above-described selective etching.

Figure 6D:
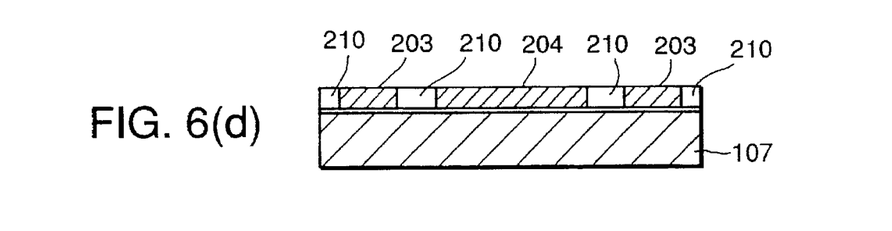

In the step shown in FIG. 6(d), device separating regions 210 are formed on the obtained semiconductor layer 102. Active components constituting a matrix are formed in regions 204, while elements constituting a peripheral circuit are formed in regions 203.

Figure 6E:
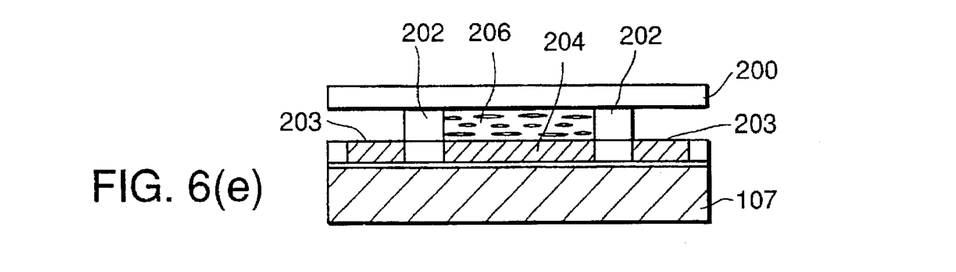

Next, in the step shown in FIG. 6(e), a glass member provided as an opposing substrate 200 having approximately the same area (surface area) as the substrate 107 is bonded to the substrate 107 with a sealing material 202 interposed therebetween, and a liquid crystal material 206 is injected into the space between the substrate 200 and the substrate 107 to be enclosed. Since the substrate 200 has the same surface area as the substrate 107, end portions of the substrate 200 are positioned on the regions 203 to serve as a protective layer for the peripheral circuit.

Figure 7:
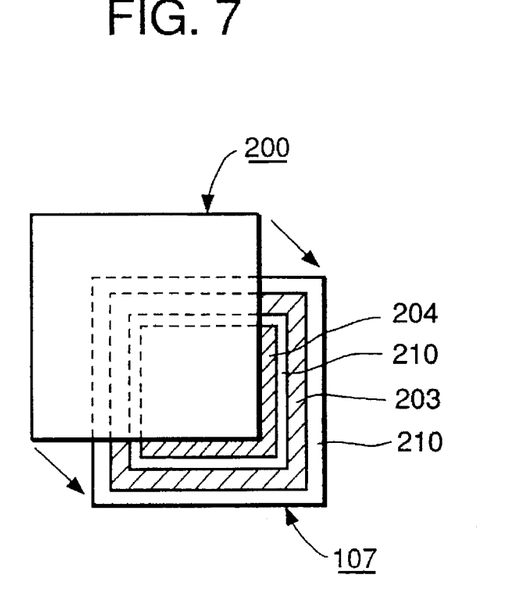
FIG. 7 is a schematic top view of the liquid crystal device in accordance with Embodiment 5.

FIG. 7 is a schematic top view of of the step of bonding the substrates 107 and 200 as shown in FIG. 6(e).

Needless to say, in a case where a light-transmissive type liquid crystal device is manufactured by using a silicon wafer as a substrate, portions of substrate 107 may be removed to form light-transmissive portions, as shown in FIGS. 1 and 2.

Figure 8:
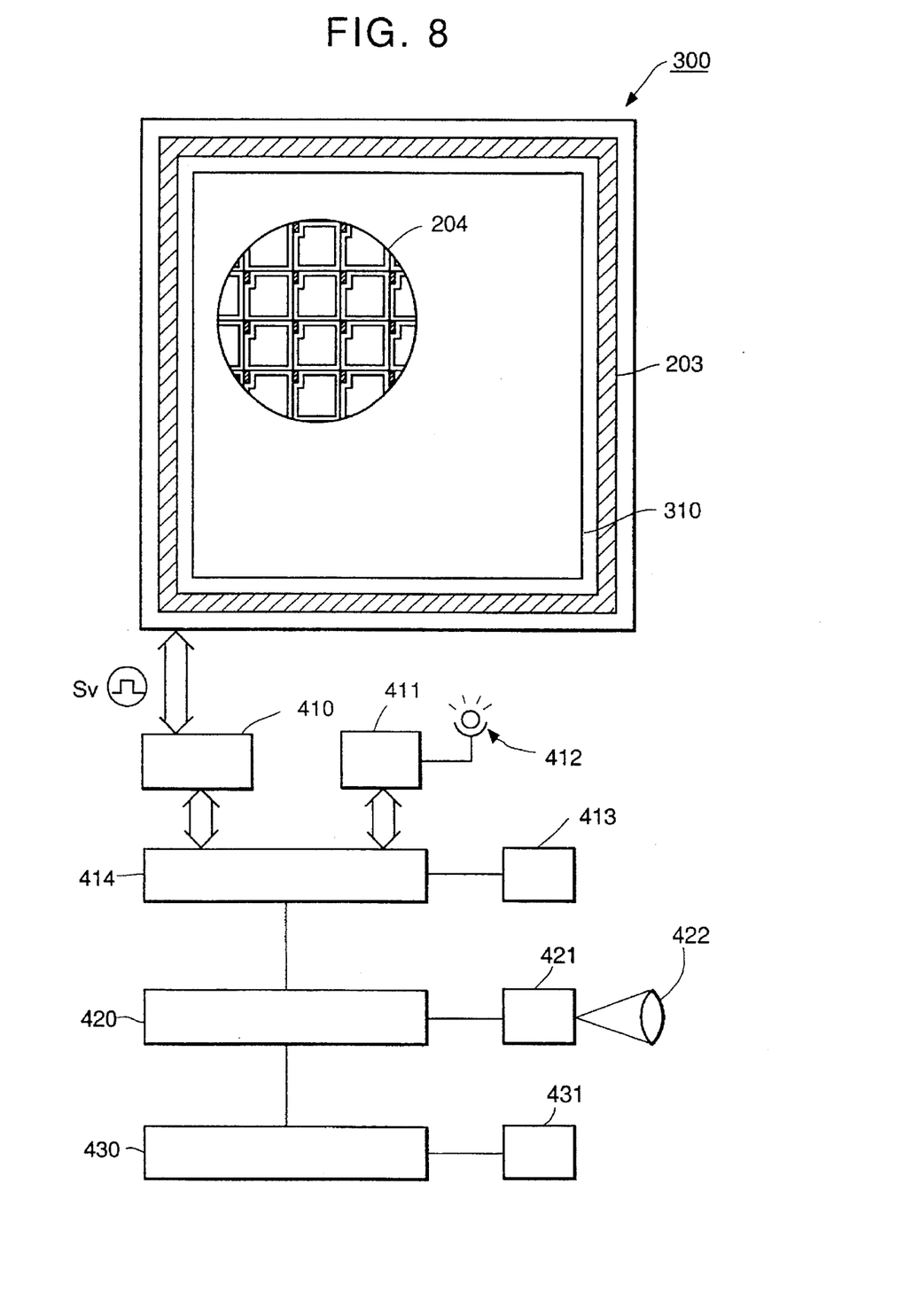
FIG. 8 is a schematic diagram of an image information processor using a liquid crystal device in accordance with the present invention.

FIG. 8 is a schematic diagram of an image information processor using a liquid crystal device in accordance with the present invention.

A unit 300 is a liquid crystal device in which a display portion 310 is formed at the center. In FIG. 8, an active matrix portion is schematically illustrated by being enlarged, as indicated in a circle 204. A peripheral circuit including a shift register is provided in a region 203 on the periphery of the display portion 310. In the peripheral circuit, a horizontal drive circuit connected to a signal wiring to supply a picture signal is provided at upper and lower sides of the display portion 310, while a drive circuit connected to a vertical gate wiring to generate a line selection signal is provided at left and right sides of the display portion 310.

These drive circuits are connected to and controlled by a drive control circuit 10 mounted on a separate substrate.

The drive control circuit 410 is connected to a central control circuit 414 along with a light source 412 and a lighting control circuit 411 including an inverter for controlling lighting of the light source.

Further, this image information processor has an optical system 422 including a lens, an image sensor 421 including an optoelectric conversion element, and a circuit for driving the image sensor 421.

Image information obtained by the image sensor 421 and/or displayed image information is recorded on a recording medium by a recording control circuit 430 including a recording head 431.

Figure 9:
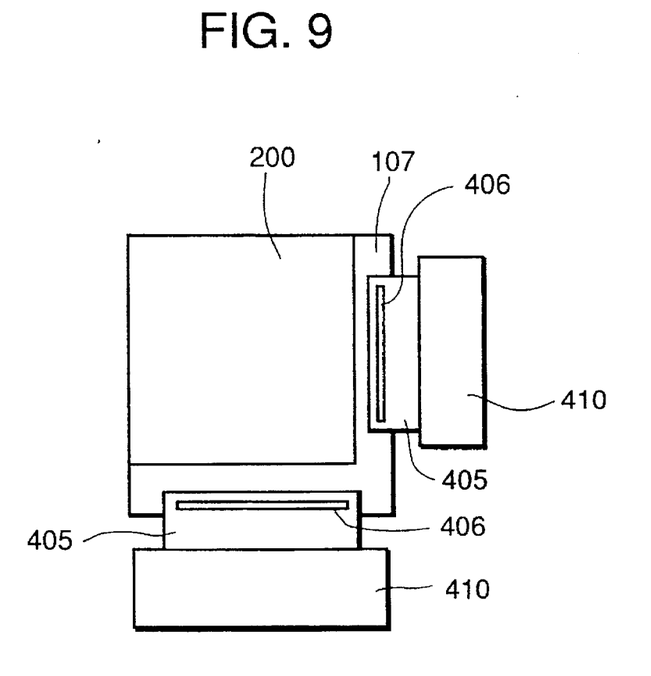
FIG. 9 is a schematic top view of a connection between a liquid crystal device and a drive control circuit in accordance with the present invention.

FIG. 9 is a schematic top view of connectors between the liquid crystal device in accordance with the present invention and the drive control circuit 410 shown in FIG. 8.

As shown in FIG. 9, the lower substrate 107 and the upper substrate 200 have different sizes such that wiring pads 406 on the lower substrate 107 are exposed outside the upper substrate 200. The pads 406 are connected to the drive control circuit 410 through flexible wirings 405. Needless to say, also in this case, the semiconductor devices of the peripheral circuit on the substrate 107 are protected by being covered with the upper substrate 200.

If the liquid crystal device is used as a display device in this manner, a picture signal from the circuit 410 on the separate substrate is supplied to the peripheral circuit through the flexible wirings 405 to display an image.

In accordance with the present invention, as described above, the difference between the thermal expansion coefficients of the pair of substrates is limited to ±50% or less to reduce the influence of a heat history during the substrate assembly process, whereby restrictions on the processing temperature can be relaxed.

For example, in a case where a thermosetting sealing material is used, the sealing material is ordinarily set in a temperature range of 150° to 200° C. Under this condition, in the case of the conventional arrangement, the accuracy of bonding of the upper and lower substrates in this step is lowered so that pixel misalignment occurs. According to the present invention, however, pixel misalignment caused in this manner can be prevented by setting the difference between the thermal expansion coefficients within the range of ±50% or less.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A liquid crystal device comprising:

first and second substrates opposed to each other at a predetermined distance, said substrates being formed of different materials, said first substrate including light-transmissive and non-light-transmissive layers; and a liquid crystal enclosed between said first and second substrates, wherein a difference between a thermal expansion coefficient of said non-light-transmissive layer and a thermal expansion coefficient of said second substrate is within a range of ±50% of a thermal expansion coefficient of said first substrate over a temperature range for sealing said first and second substrates together without intentional deformation of either said first substrate or said second substrate.

2. A liquid crystal device according to claim 1, wherein one of said first and second substrates comprises one of a quartz substrate and a semiconductor substrate.

3. A liquid crystal device according to claim 1, wherein one of said first and second substrates comprises a silicon substrate having a light-transmissive portion.

4. A liquid crystal device according to claim 1, wherein one of said substrates comprises a substrate having a semiconductor circuit, and the other substrate is disposed so as to cover a semiconductor device of said circuit.

5. A liquid crystal device according to claim 1, wherein the difference between the termal expansion coefficient of said non-light-transmissive layer and the termal expansion coefficient of said second substrate is within a range of ±10% of the termal expansion coefficient of said first substrate.

6. A liquid crystal device according to claim 5, wherein the difference between the thermal expansion coefficient of said non-light-transmissive layer and the thermal expansion coefficient of said non-light-transmissive layer and the thermal expansion coefficient of said second substrate is within a range of ±5% of the thermal expansion coefficient of said first substrate.

7. An image information processor comprising:

a liquid crystal device having first and second substrates opposed to each other at a predetermined distance, and a liquid crystal enclosed between said first and second substrates, said substrates being formed of different materials, said first substrate including light-transmissive and non-light-transmissive layers, wherein a difference between a thermal expansion coefficient of said non-light-transmissive layer and a thermal expansion coefficient of said second substrate is within a range of ±50% of a thermal expansion coefficient of said first substrate over a temperature range for sealing said first and second substrates together without intentional deformation of either said first substrate or said second substrate; and an image signal generation circuit for supplying an image signal to said liquid crystal device, said image signal generation circuit being provided separate from said substrates.

8. An image information processor according to claim 7, further comprising an image sensor for generating information from which said image signal is formed.

9. An image information processor according to claim 7 or 8, further comprising recording means for recording on a recording medium information based on said image signal.

10. An image information processor according to claim 7, wherein the difference between the thermal expansion coefficient of said non-light-transmissive layer and the thermal expansion coefficient of said second substrate is within a rante of ±10% of the thermal expansion coefficient of said first substrate.

11. An image information processor according to claim 10, wherein the difference between the thermal expansion coefficient of said non-light-transmissive layer and the thermal expansion coefficient of said second substrate is within a range of ±5% of the thermal expansion coefficient of said first substrate.

* * * * *

UNITED STATES PATENT AND TRADEMARK OFFICE
CERTIFICATE OF CORRECTION

PATENT NO. : 5,644,373

DATED : July 1, 1997

INVENTOR(S): TERUHIKO FURUSHIMA ET AL.

It is certified that error appears in the above-identified patent and that said Letters Patent is hereby corrected as shown below:

COLUMN 2

Line 60, "is" should read --are--.

COLUMN 3

Line 31, "10or" --10% or--.

COLUMN 6

Line 8, "$i" should read --Si--.

COLUMN 7

Line 9, "potions" should read --portions--.

COLUMN 9

Line 36, "termal" should read --thermal--;
Line 37, "termal" should read --thermal--;
Line 39, "termal" should read --thermal--.

UNITED STATES PATENT AND TRADEMARK OFFICE
CERTIFICATE OF CORRECTION

PATENT NO. : 5,644,373

DATED : July 1, 1997

INVENTOR(S) : TERUHIKO FURUSHIMA ET AL.   Page 2 of 2

It is certified that error appears in the above-identified patent and that said Letters Patent is hereby corrected as shown below:

COLUMN 10

Line 34, "rante" should read --range--.

Signed and Sealed this

Third Day of March, 1998

*Attest:*

BRUCE LEHMAN

*Attesting Officer*   Commissioner of Patents and Trademarks